United States Patent [19]

Regnault

[11] Patent Number: 5,319,609
[45] Date of Patent: Jun. 7, 1994

[54] ACOUSTIC EMISSION SYSTEM FOR SEISMIC SURVEYING AT SEA

[75] Inventor: Michel Regnault, Antony, France

[73] Assignee: Compagnie General de Geophysique

[21] Appl. No.: 962,371

[22] Filed: Oct. 16, 1992

[30] Foreign Application Priority Data

Oct. 10, 1991 [FR] France ............... 91 12812

[51] Int. Cl.⁵ .............................. G01V 1/38
[52] U.S. Cl. ......................... 367/16; 367/19; 367/144; 181/120
[58] Field of Search ............ 367/16, 19, 144; 181/115, 120

[56] References Cited

U.S. PATENT DOCUMENTS 4,146,870  3/1979  Ruehle ................... 367/15
4,908,801  3/1990  Bell et al. .............. 367/23

FOREIGN PATENT DOCUMENTS 2087556A   5/1982  United Kingdom .
2137346A  10/1984  United Kingdom .
2148001A   5/1985  United Kingdom .

Primary Examiner—J. Woodrow Eldred
Attorney, Agent, or Firm—Skjerven, Morrill, MacPherson, Franklin & Friel

[57] ABSTRACT

An acoustic emission system for seismic surveying at sea, for the purpose of emitting a soundwave in a given direction, the system comprising firstly a plurality of immersed sources mechanically connected to at least one float means and secondly a control circuit for controlling said sources and comprising a plurality of delay means suitable for applying respective phase delays to each of the sources, said delays being defined by a nominal phase law associated with said given emission direction. According to the invention, the system also includes at least two attitude sensors providing signals representative of the absolute position of at least two of said sources to correction means of said control circuit, said correction means providing each of said delay means with a signal for correcting the nominal phase law and representative of variations in the relative positions of the sources. This system has application to geological prospecting by seismic surveying at sea.

7 Claims, 2 Drawing Sheets

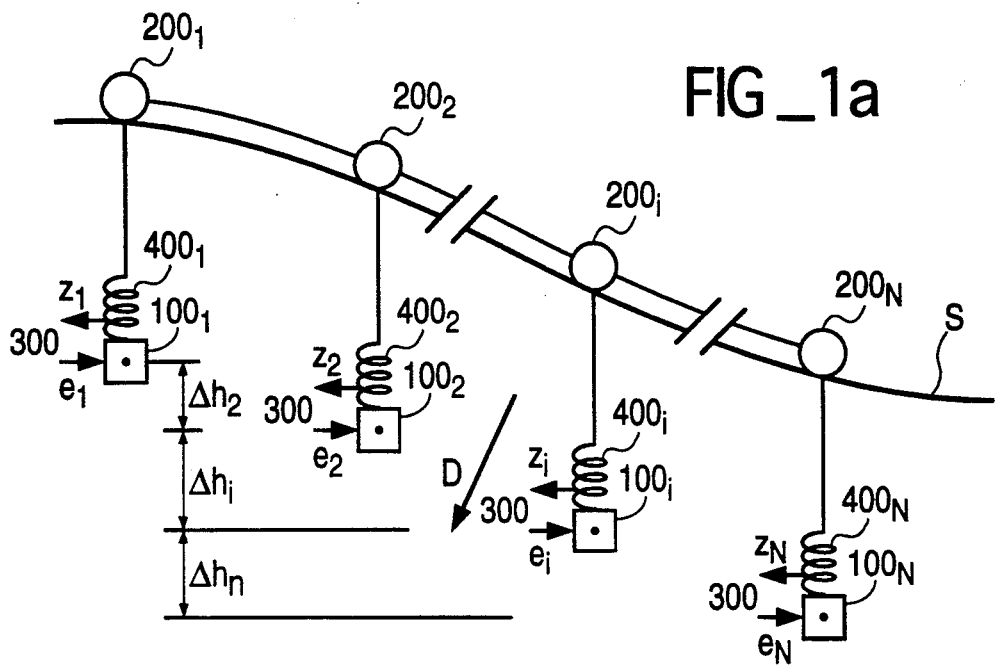
FIG_1a
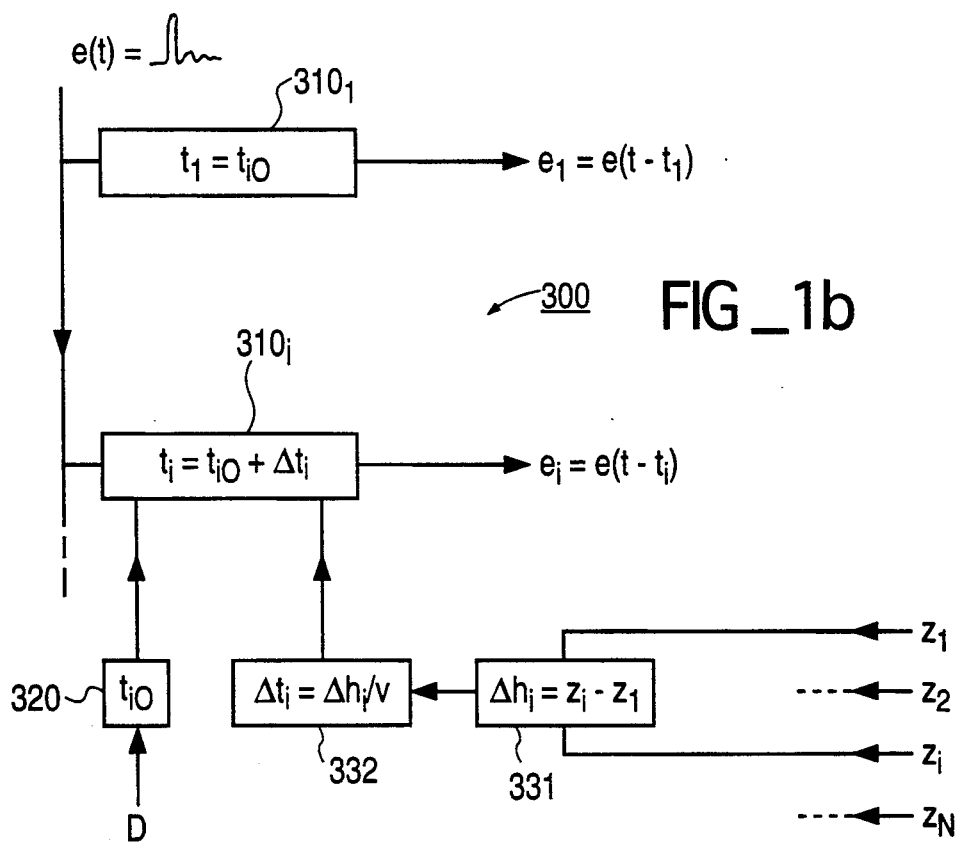
FIG_1b

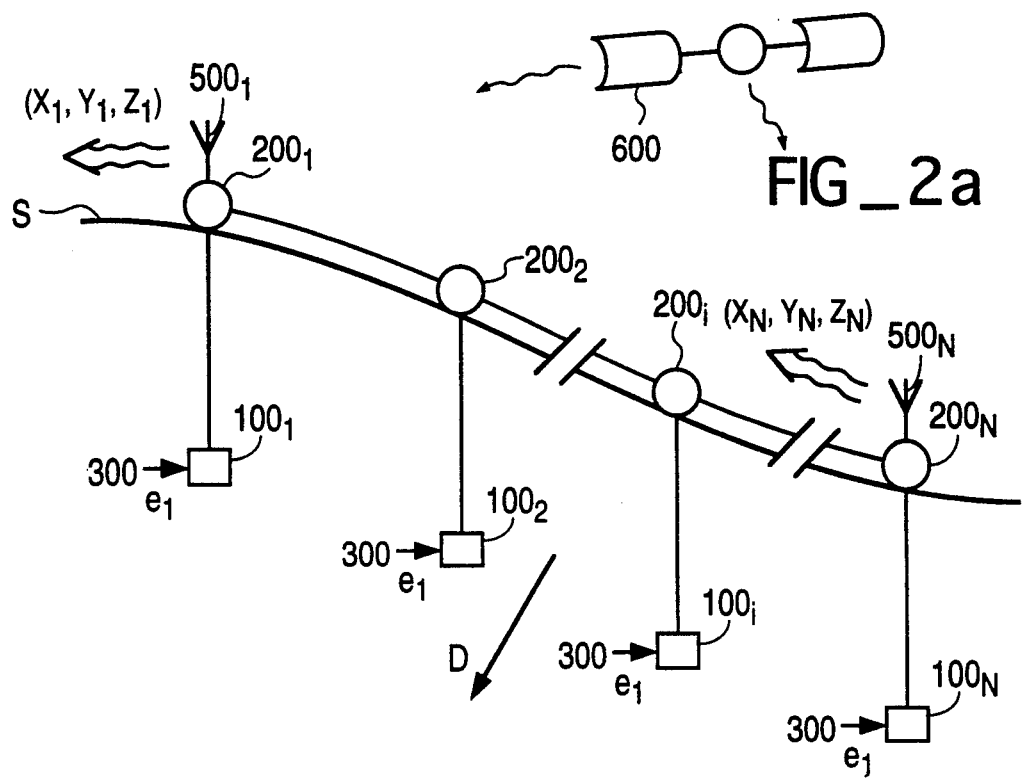
FIG_2a
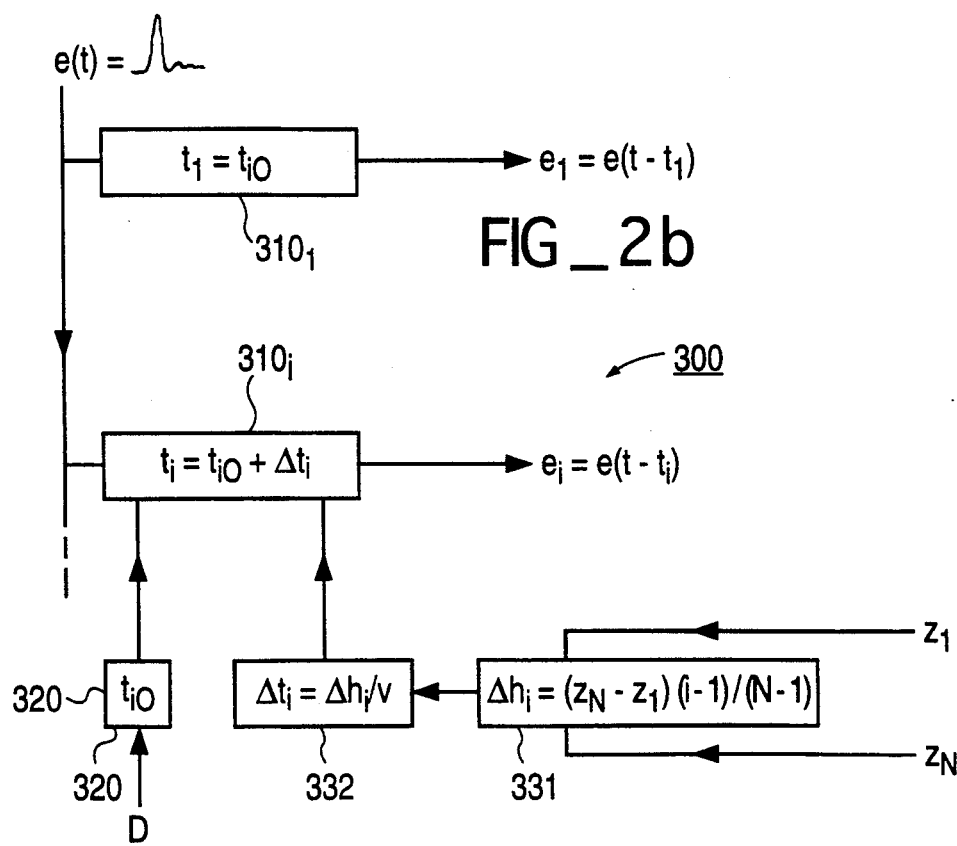
FIG_2b

ACOUSTIC EMISSION SYSTEM FOR SEISMIC SURVEYING AT SEA

The present invention relates to an acoustic emission system for seismic surveying at sea, for the purpose of emitting a soundwave in a given direction, the system comprising firstly a plurality of immersed sources mechanically connected to at least one float means, and secondly a control circuit for controlling said sources and comprising a plurality of delay means suitable for applying respective phase delays to each of the sources, said delays being defined by a nominal phase law associated with said given emission direction.

The invention is particularly applicable to geological prospection by seismic surveying at sea.

BACKGROUND OF THE INVENTION

Geological exploration of the sea bed is generally performed by means of ship towing acoustic emission systems such as the system specified above, which systems emit soundwaves in different directions towards the bed to be explored. The soundwaves are then reflected by the formations under the sea bed and they are detected by transducers disposed along cables, known as "streamers", and likewise towed by the prospecting ship. By analyzing the reflected waves relative to the waves emitted by the sources, information is obtained on the structure, the nature, and the composition of the sea bed being studied.

The sources used in acoustic emission systems for seismic surveying at sea often constitute subassemblies forming a regular array in one to three dimensions. To emit a wave in a given direction, emission from the sources is controlled in application of a phase law that governs the phase delays to be applied to the sources. A nominal phase law is defined for an ideal configuration of the sources in which the water surface is planar and completely calm. For example, under such conditions in order to emit a wave in the vertical direction perpendicular to the surface of the water, the nominal phase law is uniform in that all of the sources emit simultaneously. In contrast, a soundwave of given inclination can be obtained by offsetting emissions from consecutive sources relative to one another by a phase delay that is a function of the looked-for inclination, it being understood that the emission direction is the direction in which the waves emitted by all of the sources interfere constructively.

In practice, real prospecting conditions are significantly different from the above-mentioned ideal configuration for which the nominal phase law is defined. In particular, the surface of the sea often has short range instabilities such as waves whose space frequency is equal to or greater than the distance between two consecutive sources within a subassembly under consideration. Such surface instabilities give rise to the sources moving with pendulum motion and without correlation between one another, thereby having the effect of varying the depth of each source as a function of time. The positions of the sources relative to the surface are thus affected, with the consequence that the nominal phase law no longer corresponds to the real configuration of the sources. The nominal phase law must therefore be corrected in real time. To do this, each source may be fitted with a pressure gauge for example, thereby providing a measure at each instant of the exact depth of each source relative to the surface, thereby making it possible to establish the relative positions between the sources. The necessary corrections to the phase law so as to take into account instabilities of this type are then deduced therefrom.

A method using such depth measurement, i.e. a depth of water measured piezometrically and corresponding to the effective towing depth of each source, is described in GB-2 148 001.

However, that known correction method is not usable when the water surface although calm, i.e. not having large waves, nevertheless presents undulations of large space period due to the phenomenon of swell. Under such circumstances, the sources remain relatively steady relative to the surface and the pressure gauges of the sources do not record any variations in pressure and thus in depth. Consequently, the nominal phase law is not corrected even though the sources are not in the corresponding ideal configuration.

Thus, the technical problem to be solved by the present invention is that of providing an acoustic emission system for seismic surveying at sea and as defined in the introduction, which system should make it possible to correct the nominal phase law of emission from the sources with respect to low frequency movements of the water surface.

SUMMARY OF THE INVENTION

According to the invention, the solution to the technical problem posed consists in that said system also includes at least two attitude sensors providing signals representative of the absolute positions of at least two of said sources to correction means of said control circuit, said correction means providing each of said delay means with a signal for correcting the nominal phase law and representative of variations in the relative positions of the sources.

Thus, compared with the known correction method that uses pressure gauges, the system of the present invention has the advantage of determining the relative positions of the sources from information that is directly linked to their absolute positions and not to positions taken relative to a variable reference such as the surface of the water.

BRIEF DESCRIPTION OF THE DRAWINGS

Embodiments of the invention are described by way of example with reference to the accompanying drawings, in which:

FIG. 1a is a side view of a first embodiment of the acoustic emission system of the invention.

FIG. 1b is a block diagram of a control circuit for the system of FIG. 1a.

FIG. 2a is a side view of a second embodiment of the acoustic emission system of the invention.

FIG. 2b is a block diagram of a control circuit for the system of FIG. 2a.

DETAILED DESCRIPTION

FIG. 1a shows an acoustic emission system for seismic surveying at sea, and intended to emit a soundwave in a given direction D. This system comprises a plurality of immersed sources N referenced $100_1, 100_2, \ldots, 100_i, \ldots, 100_N$ which are mechanically connected to N float means $200_1, 200_2, \ldots, 200_i, \ldots, 200_N$ constituted by buoys, for example. In conventional manner, the sources $100_i$ ($i = 1, \ldots, N$) are guns, and the number of them may lie in the range of a few to about ten, the sources extending over a distance of 5 to 20 meters at a depth of 5 to 10 meters. Naturally float means other than individual buoys could be envisaged, e.g. a single rigid or flexible float.

FIG. 1b is a block diagram of a control circuit 300 that provides each source $100_i$ with an emission signal $e_i$ based on a signal e(t) whose pulse shape is as shown in FIG. 1b. To obtain overall acoustic emission in a given direction D, the sources $100_i$ must have applied thereto a phase law which is characterized by the phase delay $t_i$ that is to be applied to the individual emission signal $e_i$ of each source relative to the initial signal e(t). $e_i$ is therefore given by:

$$e_i = e(t - t_i).$$

The phase delay may be defined in absolute terms or else relative to a reference source, e.g. the first source $100_1$, in which case $t_1$ is taken to be equal to 0.

For a given subset of sources, it is possible, a priori, to define a nominal phase law which is associated with each emission direction D that corresponds to the ideal situation of a perfectly planar surface S. The phase delays $t_{i0}$ characteristic of the nominal phase law for a given direction D are stored in a read-only memory (ROM) 320 and are applied to the reference signal e(t) by variable delay lines $310_i$.

As shown in FIG. 1a, when the surface S of the water is not perfectly planar but is subjected to a long period swell, for example, then although the sources $100_i$ are all situated at the same depth below the surface, they are no longer in the ideal configuration for which the nominal phase law is defined. In particular, the positions $z_i$ of the sources relative to a vertical axis are no longer identical. This gives rise to an error in the real emission direction that must be taken into account in order to re-establish the desired emission direction.

In the embodiment of FIGS. 1a and 1b, the system of the invention includes sensors $400_1, 400_2, \ldots, 400_i, \ldots, 400_N$, disposed in the proximity of the sources and providing a signal representative of the absolute positions $z_i$ of said sources $100_i$ to correction means 331, 332. These correction means comprise subtractor means 331 giving the variation in the relative position $\Delta h_i = z_i - z_1$ of the source of order i relative to the source of order 1, for example. Then, correction calculation means 332 evaluate the correction signal $\Delta t_i$ to be added to the phase delay $t_{i0}$ of the nominal phase law in order to obtain the delay $t_i$ to be applied to the reference signal e(t). The correction signal $\Delta t_i$ given by:

ti $\Delta t_i = \Delta h_i / v$ where v is the propagation speed in water of the soundwaves under consideration, and is representative of variations in the relative positions of the sources while the system is subjected to swell motion.

The attitude sensors $400_i$ may be speed meters or accelerometers respectively measuring vertical speed or vertical acceleration of the sources $100_i$. Merely by integration, the velocity meters give the absolute positions $z_i$ to within a constant, which constant is then cancelled when the subtractor means 331 takes the difference $\Delta h_i = z_i - z_1$. Similarly, accelerometers provide absolute positions $z_i$ with two integration constants, one of which is likewise cancelled by taking the difference, and the other of which is set to be equal to zero by making an appropriate choice for the time origin.

FIG. 2a shows a variant embodiment of the system of the invention in which the attitude sensors are stations $500_1$ and $500_N$ of a positioning system disposed on the first and last buoys $200_1$ and $200_N$, for example. Said positioning system may be a satellite system such as that known under the name Global Positioning System (GPS). In this system, the three coordinates $(x_1, y_1, z_1)$ and $(x_N, y_N, z_N)$ defining the absolute positions of the two buoys $200_1$ and $200_N$ are provided by a network of artificial satellites 600. It may be observed that the vertical positions $z_1$ and $z_N$ of the two buoys $200_1$ and $200_N$ are equal to the vertical positions of the two end sources $100_1$ and $100_N$, to within a constant error equal to the depth of the sources. It is therefore possible to deduce changes in the relative positions $\Delta h_N = z_N - z_1$ of the two extreme sources and also the correction signal $\Delta t_N = \Delta h_N / v$ to be applied to the delay line $310_N$. To determine the correction signals for the other sources $100_2, \ldots, 100_i, \ldots, 100_{N-1}$, it may be assumed that the absolute positions of the sources have a linear distribution. Under such circumstances, the correction means 332 is constituted by interpolation/extrapolation means that calculate the variations $\Delta h_i$ in relative position using the formula:

$$\Delta h_i = (z_N - z_1)\frac{i-1}{N-1}$$

The correction signals $\Delta t_i = \Delta h_i / v$ are then deduced therefrom.

In FIGS. 1a and 1b, the delay lines $310_i$ are disposed in parallel on the reference signal e(t) such that the phase delays $t_i$ are evaluated relative to the signal $e_1$ as applied to the first source $100_1$. Naturally, the delay lines could equally well be connected in series, with the phase delay for any one source then needing to be determined relative to the preceding source.

I claim:

1. An acoustic emission system for seismic surveying at sea, for the purpose of emitting a soundwave in a given direction, the system comprising firstly a plurality of immersed sources mechanically connected to at least one float means and secondly a control circuit for controlling said sources and comprising a plurality of delay means suitable for applying respective phase delays to each of the sources, said delays being defined by a nominal phase law associated with said given emission direction, wherein said system also includes at least two attitude sensors providing signals representative of the absolute positions of at least two of said sources to correction means of said control circuit, said correction means providing each of said delay means with a signal for correcting the nominal phase law and representative of variations in the relative positions of the sources.

2. A system according to claim 1, wherein said system includes two attitude sensors and a plurality of more than two sources, said correction means including interpolation/extrapolation means suitable for determining the variations in the relative positions of the sources.

3. A system according to claim 1, wherein said attitude sensors are disposed in the proximity of the sources.

4. A system according to claim 1, wherein said attitude sensors are disposed on said float means.

5. A system according to claim 1, wherein said attitude sensors are velocity meters.

6. A system according to claim 1, wherein attitude sensors are accelerometers.

7. A system according to claim 4, wherein said attitude sensors are stations in a positioning system.

* * * * *

UNITED STATES PATENT AND TRADEMARK OFFICE
CERTIFICATE OF CORRECTION

PATENT NO.   : 5,319,609
DATED        : June 7, 1994
INVENTOR(S)  : Michel Regnault It is certified that error appears in the above-identified patent and that said Letters Patent is hereby corrected as shown below:

On the title page:

Item [30]: Foreign Application Priority Data, the filing date of the French Priority should read: "October 17, 1991" and not "October 10, 1991".

Signed and Sealed this

Twenty-second Day of November, 1994

Attest:

BRUCE LEHMAN

Attesting Officer   Commissioner of Patents and Trademarks

UNITED STATES PATENT AND TRADEMARK OFFICE
CERTIFICATE OF CORRECTION

PATENT NO. : 5,319,609
DATED : June 7, 1994
INVENTOR(S) : Michel Regnault

It is certified that error appears in the above-indentified patent and that said Letters Patent is hereby corrected as shown below:

On the Title Page, item [73], change "General" to --Generale--.

Signed and Sealed this

Twenty-first Day of March, 1995

Attest:

BRUCE LEHMAN

Attesting Officer     Commissioner of Patents and Trademarks